United States Patent
Tachibana et al.

(10) Patent No.: US 7,697,452 B2
(45) Date of Patent: Apr. 13, 2010

(54) METHOD AND MANAGEMENT APPARATUS FOR CLASSIFYING CONGESTION PATHS BASED ON PACKET DELAY

(75) Inventors: Atsuo Tachibana, Fujimino (JP); Shigehiro Ano, Fujimino (JP); Toru Hasegawa, Fujimino (JP)

(73) Assignee: KDDI R&D Laboratories Inc., Fujimino-shi (JP)

( * ) Notice: Subject to any disclaimer, the term of this patent is extended or adjusted under 35 U.S.C. 154(b) by 443 days.

(21) Appl. No.: 11/712,426

(22) Filed: Mar. 1, 2007

(65) Prior Publication Data
US 2007/0211645 A1 Sep. 13, 2007

(30) Foreign Application Priority Data
Mar. 7, 2006 (JP) ............................. 2006-060470

(51) Int. Cl.
*H04L 12/26* (2006.01)
(52) U.S. Cl. ....................................... 370/252; 370/237
(58) Field of Classification Search ................. 370/252, 370/242, 244, 253, 254, 255, 235, 236, 237
See application file for complete search history.

(56) References Cited

U.S. PATENT DOCUMENTS

| 2002/0112060 A1* | 8/2002 | Kato ........................ 709/227 |
| 2004/0105391 A1* | 6/2004 | Charcranoon ............... 370/252 |
| 2006/0285489 A1* | 12/2006 | Francisco et al. ........... 370/229 |

OTHER PUBLICATIONS

Atsuo Tachibana et al., "Empirical Study on Locating Congested Segments over the Internet Based on Multiple End-to-End Path Measurements", in Proc. E.G., EE/IPSJ Saints, 2005, pp. 1-10.
Masato Tsuru et al., "Inferring link characteristics from end-to-end path measurements", In Proc. Institute of Electrical and Electronic Engineers ICC, Helsinki, 2001, 1534-1538.

* cited by examiner

*Primary Examiner*—Brian D Nguyen
(74) *Attorney, Agent, or Firm*—Westerman, Hattori, Daniels & Adrian, LLP (57) ABSTRACT

A method and a management apparatus for classifying congestion paths based on packet delay in a plurality of paths between measurement nodes. The method and the apparatus specify the short-time congestions based on packet delay in Internet Protocol network.

12 Claims, 5 Drawing Sheets

METHOD AND MANAGEMENT APPARATUS FOR CLASSIFYING CONGESTION PATHS BASED ON PACKET DELAY

PRIORITY CLAIM

The present application claims priority from Japanese Patent Application No. 2006-060470 filed on Mar. 7, 2006, which is incorporated herein by reference.

BACKGROUND OF THE INVENTION

1. Field of the Invention

The present invention relates to a method and a management apparatus for classifying congestion paths based on packet delay. In particular, the method and the apparatus specify the short-time congestions based on packet delay in IP (Internet Protocol) network.

2. Description of the Related Art

First related art, "Empirical Study on Locating Congested Segments over the Internet Based on Multiple End-to-End Path Measurements" by A. Tachibana, S. Ano, T. Hasegawa, M. Tsuru, Y. Oie, In Proc. E.G., EE/IPSJ SAINT, 2005, discloses a related art in which a plurality of paths are actively measured between measurement nodes, and the quality degradation segment in the network is determined.

The property of measured path is for example packet loss rate or packet delay. A segment is a part which a path is split into branches. According to this art, measurement value is compared with predetermined threshold value, and a quality of the path is determined step by step (good/fair/bad). Then, the quality-degraded segment in the network is specified by the combination of routes in the quality degradation paths.

Second related art, "Inferring link characteristics from end-to-end path measurements", In Proc. Institute of Electrical and Electronic Engineers ICC, Helsinki (2001), 1534-1538, discloses a related art in which a plurality of test packets is continuously sent to a plurality of paths in short-time intervals, and the quality of the shared segment is estimated by the correlation of received packets.

According to the first related art, a measurement value (for example, mean value or the maximum in the uniformity cycle) is compared with a predetermined threshold value. However, when the difference is small, good/bad is extremely judged. Thus, classification results differ significantly according to the threshold value. Also, according to the second related art, a correlation between the packets is judged for all test packets. Therefore, a highly precise measurement and a complicated calculation are required.

According to the related arts, a degradation status is judged for every path. The judgment is based on a plurality of measurement value including the mean value or the maximum of the path property. In reality, when a quality degradation occurs in one segment, the quality degradation occurs simultaneously in a plurality of paths passing the segment. Nevertheless, it is judged as single degradation for each path, and the correlation of the path is detected from all measurements value.

Also, according to the related arts, quality-degraded segment is specified for every path by the measurement value of the path property. Thus, congestion occurring for a short time (for example, 20 ms), such as packet delay, cannot be specified. However, there is the case where a nucleus network is constructed by optical fiber. In this case, short-time congestion has a big influence to the whole network. Thus, it is necessary to avoid a route which occasionally produces short-time congestions.

BRIEF SUMMARY OF THE INVENTION

It is therefore an object of the present invention to provide a method and a management apparatus for classifying paths sharing experience of congestion caused by packet delay.

According to the present invention, a method is provided for classifying congestion paths based on packet delay in a plurality of paths between measurement nodes. The method has the steps of: receiving a measurement data unit including an origin node, a destination node, and a sent time and a received time in a received packet from the measurement node, arranging the measurement data units of the same origin node in order of sent time, extracting a pair of measurement data units of which an interval time between the sent times of adjacent measurement data units is less than the threshold time, arranging the measurement data units of the same destination node in order of the received time, extracting a pair of measurement data units of which an interval time between the received times of adjacent measurement data units is less than the threshold time, means calculating packet delay based on the difference between the sent time and the received time for a plurality of extracted measurement data units, and specifying the congestion path based on the packet delay.

It is preferred that the specifying step, calculates the minimum value of the packet delay for every path, calculates square sum of difference between the packet delay and the minimum value for every two pair of measurement data units, calculates the mean of those square sums as non-similarity, and derives the pair of measurement data units of low non-similarity.

It is also preferred that the specifying step further, generates a dendrogram applied by Ward system in order of the pairs of the low non-similarity, and classifies the paths depending on non-similarity of the dendrogram.

According to the present invention, a management apparatus is provided for classifying congestion paths based on packet delay in a plurality of paths between measurement nodes. The management apparatus comprising: means for receiving a measurement data unit including an origin node, a destination node, and a sent time and a received time in a received packet from the measurement node, means for arranging the measurement data units of the same origin node in order of sent time, extracting a pair of measurement data units of which an interval time between the sent times of adjacent measurement data units is less than the threshold time, arranging the measurement data units of the same destination node in order of the received time, extracting a pair of measurement data units of which an interval time between the received times of adjacent measurement data units is less than the threshold time, means for calculating packet delay based on the difference between the sent time and the received time for a plurality of extracted measurement data units, and means for specifying the congestion paths based on the packet delay.

It is also preferred that the specifying means further has means for generating a dendrogram applied by Ward system in order of the pairs of the low non-similarity, and means for classifying the paths depending on non-similarity of the dendrogram.

It is also preferred that the specifying means further has means for generating a dendrogram applied by Ward system in order of the pairs of the low non-similarity, and means for classifying the paths depending on non-similarity of the dendrogram.

According to the present invention is to provide a method for causing a computer to function as a management apparatus for classifying congestion paths based on packet delay in a plurality of paths between measurement nodes. The method has the steps of: receiving a measurement data unit including an origin node, a destination node, and a sent time and a received time in a received packet from the measurement node, arranging the measurement data units of the same origin node in order of sent time, extracting a pair of measurement data units of which an interval time between the sent times of adjacent measurement data units is less than the threshold time, arranging the measurement data units of the same destination node in order of the received time, extracting a pair of measurement data units of which an interval time between the received times of adjacent measurement data units is less than the threshold time, calculating packet delay based on the difference between the sent time and the received time for a plurality of extracted measurement data units, and specifying the congestion path based on the packet delay.

It is preferred that the specifying step, calculates the minimum value of the packet delay for every path, calculates square sum of difference between the packet delay and the minimum value for every pair of measurement data units, calculates the mean of those square sums as non-similarity, and derives the pair of measurement data units of low non-similarity.

It is also preferred that the specifying step further, generates a dendrogram applied by Ward system in order of (the pairs of) the low non-similarity, and classifies the paths depending on non-similarity of the dendrogram.

According to the present invention, in particular, congestion occurring for a short time in the IP network is detected. The present invention detects short-time congestion in the IP network, and classifies paths sharing experience of congestion caused by the packet delay.

DETAILED DESCRIPTION OF THE INVENTION

Figure 1:
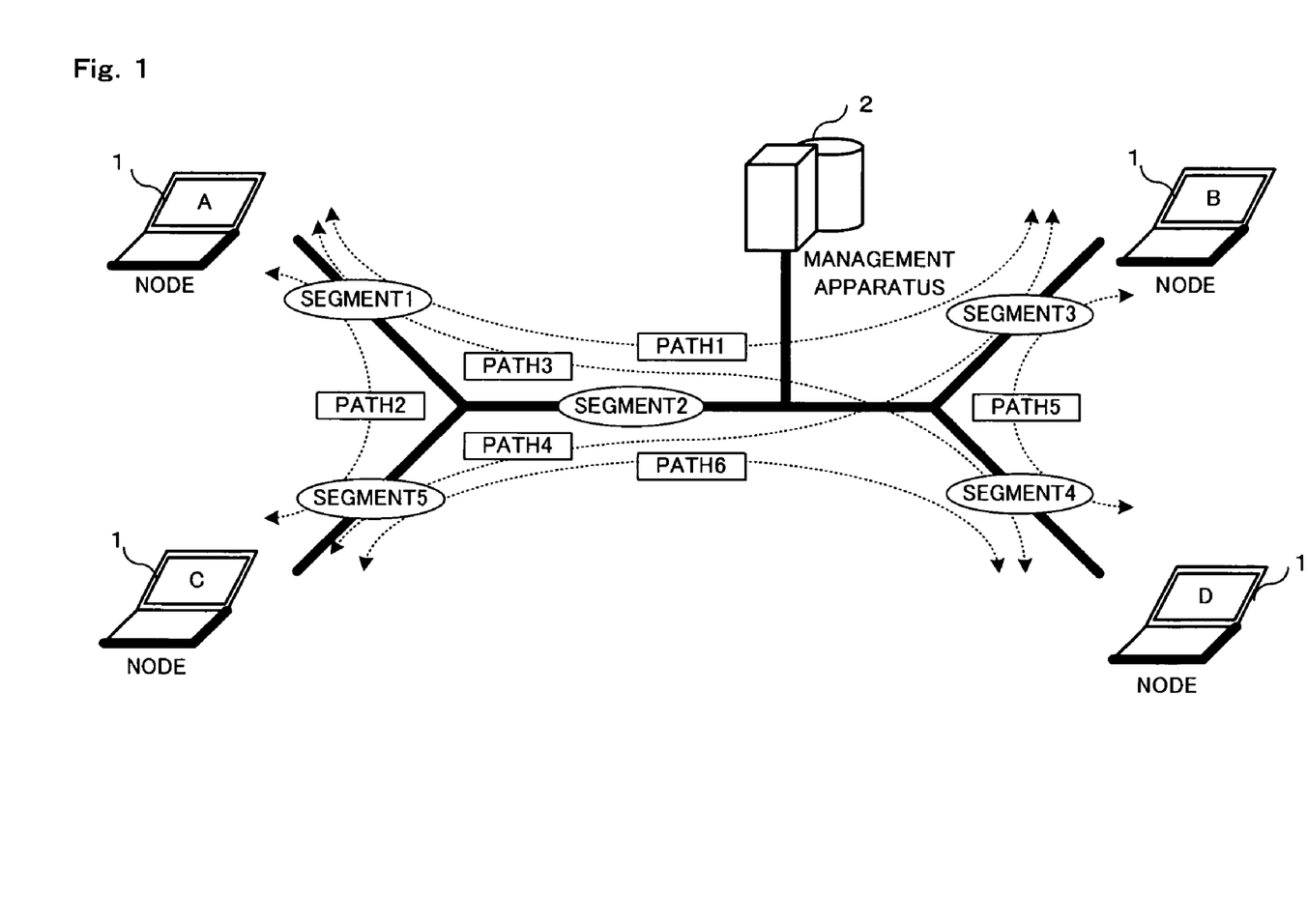
FIG. 1 shows a network configuration diagram.

FIG. 1 shows a network configuration diagram.

According to FIG. 1, four measurement nodes A-D are connected through a network including segments 1-5. Also, management apparatus 2 is connected to the network. All measurement nodes A-D send a plurality of packets to the management apparatus 2. "Path" means a route between two measurement nodes. Also, "segment" means a part of path split into branches. For example, PATH1 shows a route between measurement node A and measurement node B. PATH1 is connected through segment 1, segment 2 and segment 3.

Table 1 shows a network topology of FIG. 1.

TABLE 1

Network Topology

| | Path 1 | Path 2 | Path 3 | Path 4 | Path 5 | Path 6 |
|---|---|---|---|---|---|---|
| Segment 1 | ○ | ○ | ○ | | | |
| Segment 2 | ○ | | ○ | ○ | | ○ |
| Segment 3 | ○ | | | ○ | ○ | |
| Segment 4 | | | ○ | | ○ | ○ |
| Segment 5 | | ○ | | ○ | | ○ |

Figure 2:
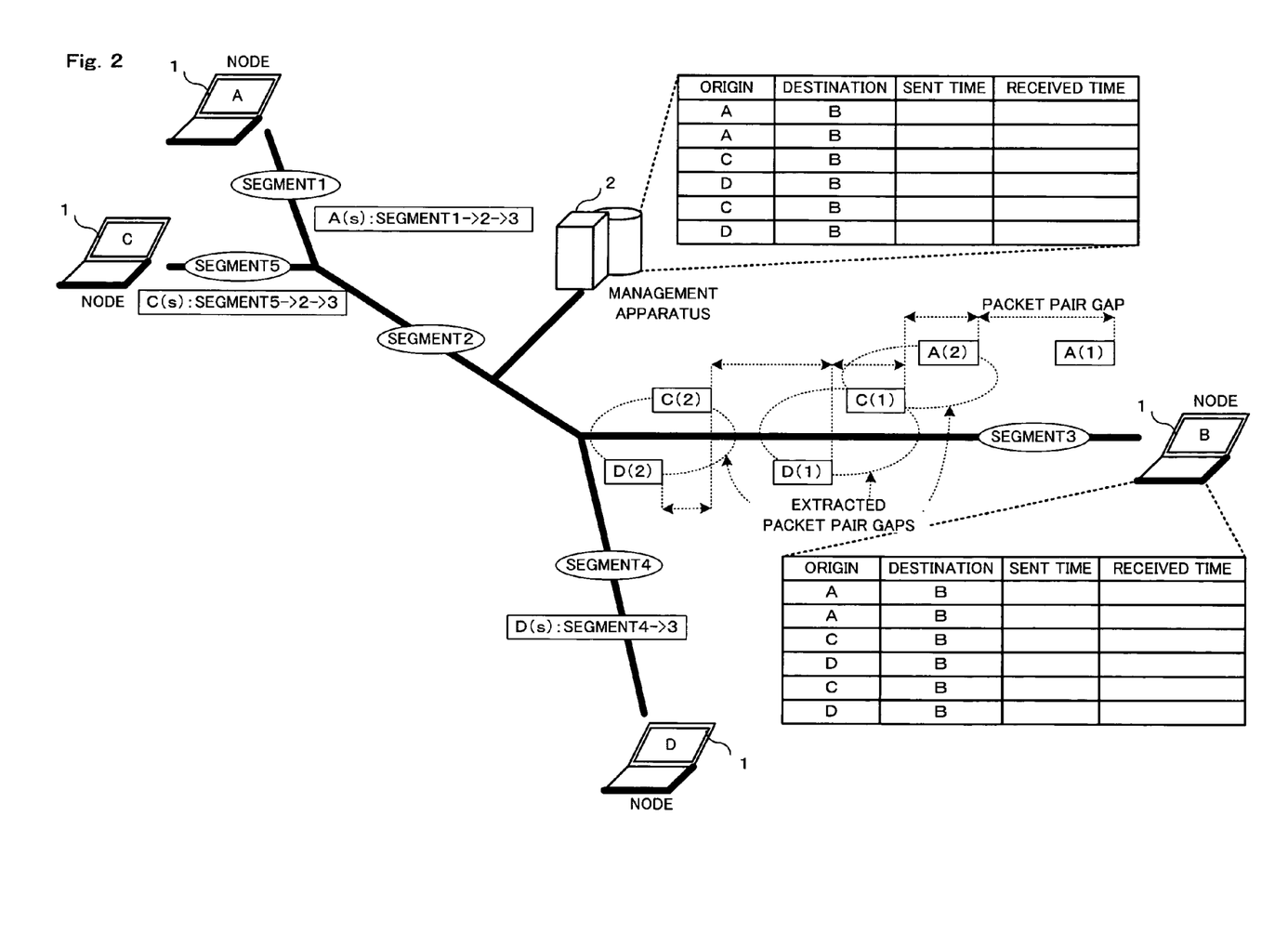
FIG. 2 shows an illustration of receiving packets in the present invention.

FIG. 2 shows an illustration of receiving packets in the present invention.

"Packet pair" means a pair of two packets which are temporally adjacent. According to FIG. 2, it looks at measurement node B. The measurement node B is connected to PATH1 for the measurement node A, PATH4 for measurement node C, and PATH5 for measurement node D. PATH1 is connected through segments 1, 2 and 3, PATH4 is connected through segments 2, 3 and 5, and PATH5 is connected through segments 3 and 4.

Table 2 shows a network topology for measurement node B.

TABLE 2

Network Topology for the measurement node B

| | Path 1 | Path 4 | Path 5 |
|---|---|---|---|
| Segment 1 | ○ | | |
| Segment 2 | ○ | ○ | |
| Segment 3 | ○ | ○ | ○ |
| Segment 4 | | | ○ |
| Segment 5 | | ○ | |

As it is clear from table 2, a congestion based on a delay occurred in the segment 2 is experienced by a plurality of packets passed through PATH1 and PATH4. Also, a congestion based on a delay occurred in segment 3 is experienced by a plurality of packets passed through PATH1, PATH4 and PATH5.

According to FIG. 2, the packets of the same destination node are arranged in order of the received time. The pairs of packets of which interval time between the received times of adjacent packets is less than the threshold time are extracted. "Packet pair gap" means an interval time of the received time or the sent time between the two packets of the pair. In FIG. 2, an identifier and a sequence number of the origin node are shown for every packet.

Table 3 arranges packets received by the measurement node B in order of the received time.

TABLE 3

Packets received by measurement node B

| Source A (1) | Sent time |
|---|---|

↑ x (non-measurement packet pair)
↓ : same Source

| Source A (2) | Sent time |
|---|---|

↑ o (measurement packet pair)
↓ : less than the threshold time

TABLE 3-continued

Packets received by measurement node B

| Source C (1) | Sent time |

↑ o (measurement packet pair)
↓ : less than the threshold time

| Source D (1) | Sent time |

↑ x (non-measurement packet pair)
↓ : longer than the threshold time

| Source C (2) | Sent time |

↑ o (measurement packet pair)
↓ : less than the threshold time

| Source D (2) | Sent time |

"Packet pair" for measurement is extracted based on table 3. The two packets of the extracted pair are adjacent temporally, and are different in path (origin nodes are different). Further, the interval time (packet pair gap) between two packets is less than the threshold time (for example, less than 20 ms).

i) In packet A (1) and packet A (2), origin node A is same, and also the path is same. Thus, packet A (1) and packet A (2) are not extracted as a packet.

ii) In packet A (2) and packet C (1), the packet pair gap is less than the threshold time. Thus, packet A (2) and packet C (1) are extracted as a packet.

iii) In packet C (1) and packet D (1), the packet pair gap is less than the threshold time. Thus, packet C (1) and packet D (1) are extracted as a packet.

iv) In packet D (1) and packet C (2), the packet pair throat depth is longer than the threshold time. Thus, packet D (1) and packet C (2) are not extracted as a packet.

v) In packet C (2) and packet D (2), the packet pair gap is less than the threshold time. Thus, packet C (2) and packet D (2) are extracted as a packet.

In reverse to the above-mentioned description, the packets of the same origin node are arranged in order of the sent time. And two packets of which interval time between the sent times of adjacent packets is less than the threshold time, are extracted. Thus, when those extracted packets are arranged in order of sent time, it is different from above-mentioned table 3.

Table 4 arranges the packets sent to measurement node B in order of sent time.

TABLE 4

Packets received by measurement node B

| Source A (1) | Sent time |

↑ x (non-measurement packet pair)
↓ : longer than the threshold time

| Source C (1) | Sent time |

↑ x (non-measurement packet pair)
↓ : same Source

TABLE 4-continued

Packets received by measurement node B

| Source C (2) | Sent time |

↑ o (measurement packet pair)
↓ : less than the threshold time

| Source A (2) | Sent time |

↑ o (measurement packet pair)
↓ : less than the threshold time

| Source D (1) | Sent time |

↑ x (non-measurement packet pair)
↓ : same Source

| Source D (2) | Sent time |

A pair of packets for measurement is further extracted based on table 4. An extracted packet pair is two packets which are temporally adjacent, and the paths of the two packets are different (destination nodes are different). Further, the packet pair gap is less than the threshold time (for example, less than 20 ms).

According to the present invention, only a packet with the possibility to experience simultaneous short-time congestion is extracted. The packet delay can be measured only for those packets. Based on this packet delay fluctuation (the difference between the present delay and the minimum delay), a path to experience the same congestion can be derived.

The transferred packet further includes the sent time. Thus, the packet may be a test packet for measurements, and it may be normal data packet. For example, in the case of RTP (Realtime Transfer Protocol), a time stamp is included in a header.

Figure 3:
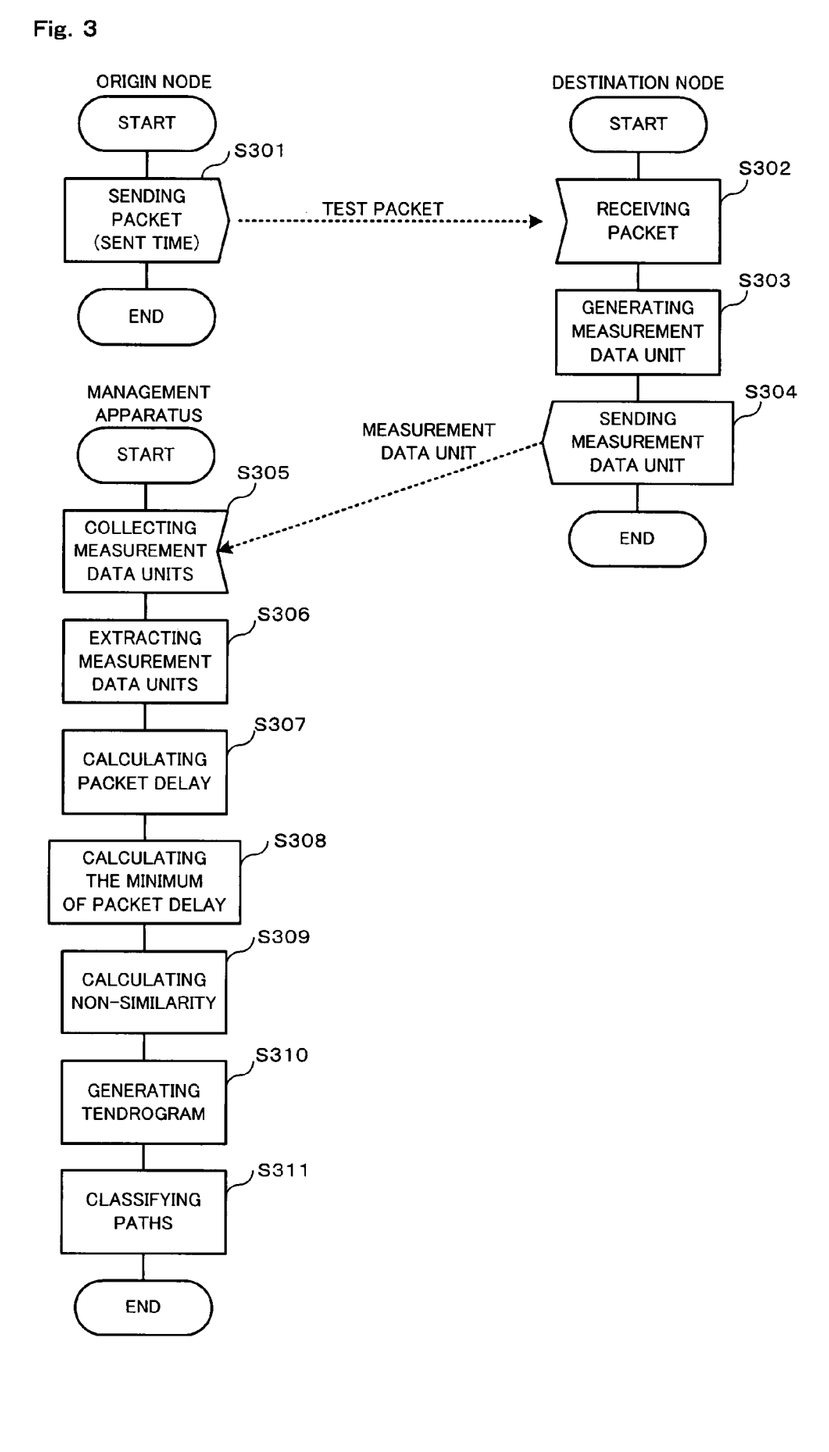
FIG. 3 shows a flowchart in the present invention.

FIG. 3 is a flowchart of the present invention.

(S301) The origin node sends a plurality of packets to a destination node. The packet includes a sent time. Also, the interval time sending the packets is not constant (is random). The time of all measurement nodes is synchronized.

(S302) The destination node receives the packets sent from the origin node. Then, the received time is added to each packet. Thus, the sent time and the received time are obtained for every receive packet.

(S303) The destination node generates a measurement data unit for every received packet. The measurement data unit includes an address of the origin node, an address of the destination node, a sent time and a received time.

TABLE 5

| Measurement data | | | |
|---|---|---|---|
| Origin Address | Destination Address | Sent Time | Received Time |

(S304) The destination node sends the measurement data unit for every packet to the management apparatus.

(S305) The management apparatus receives a plurality of measurement data units from a plurality of destination nodes. The management apparatus stores these collected measurement data units.

(S306) The management apparatus arranges the measurement data units of the same origin node in order of sent time. And a pair of measurement data units of which an interval time (packet pair gap) between the sent times of adjacent measurement data units is less than the threshold time, is extracted. Also, the measurement data units of the same destination node are arranged in order of the received time. And a pair of measurement data units of which an interval time between the received times of adjacent measurement data units is less than the threshold time, is extracted. For example, the threshold time may be 20 ms. Thus, when the congestion caused by delay of more than 20 ms occurred in one segment, a plurality of paths through the segment detects the same packet delay fluctuation.

(S307) The management apparatus derives a packet delay from a difference between the sent time of the origin node and the received time of the destination node, in a pair of packets extracted.

(S308) The minimum value of the packet delay is derived for every path. The minimum value becomes a reference value of the packet delay fluctuation. Thus, the packet delay fluctuation is calculated for the minimum value.

(S309) A non-similarity "d" is calculated by the following equations.

$$n*d^2 = \Sum_{k=1}^{n}\{(xk-yk)/\text{ave}(xk,yk)\}^2 \qquad [\text{Equation 1}]$$

"n" means the number of pairs of packets. "xk" means first packet delay (a difference between the present delay and the minimum delay in first path) of first packet in first path. "yk" means second packet delay (a difference between the present delay and the minimum delay in second path) of second packet in second path. The first packet and the second packet are "packet pair", and are in different paths respectively. Thus, the (xk−yk) means a difference between the packet delays for the pair in different paths. "ave (xk, yk)" means a mean value of the difference between the packet delays. Thus, "(xk−yk)/ave(xk,yk)" means ratio of the difference between the packet delays to the mean value. The non-similarity "d" is calculated by square sum of these ratios.

(S310) A dendrogram (a tree diagram) is generated in order of low pair of non-similarity "d". This applies the Ward system of the cluster analysis (numerical taxonomy). The cluster analysis classifies a plurality of objects of the different property in the similar groups. The Ward system is one of the hierarchical type cluster analysis methods. This method calculates the sum of squared deviation from the center of gravity of the cluster for all individuals. And a cluster is constructed so that the increase of the sum of squares in the cluster becomes as small as possible. As criteria of the similar judgment, the Euclid square distance is often used. The merge of the pairs of the similar paths is repeated, and dendrogram is generated.

(S311) Depending on non-similarity in the dendrogram, the paths are classified. For example, the paths are classified for example ½ of the maximum of the non-similarity. When congestion occurred in one segment, the dendrogram classifies the paths in two clusters.

After that, the routing information of each path is compared. Then, the segment that shares the congestion path and does not pass non-congestion paths, is specified as the congestion segment.

Figure 4:
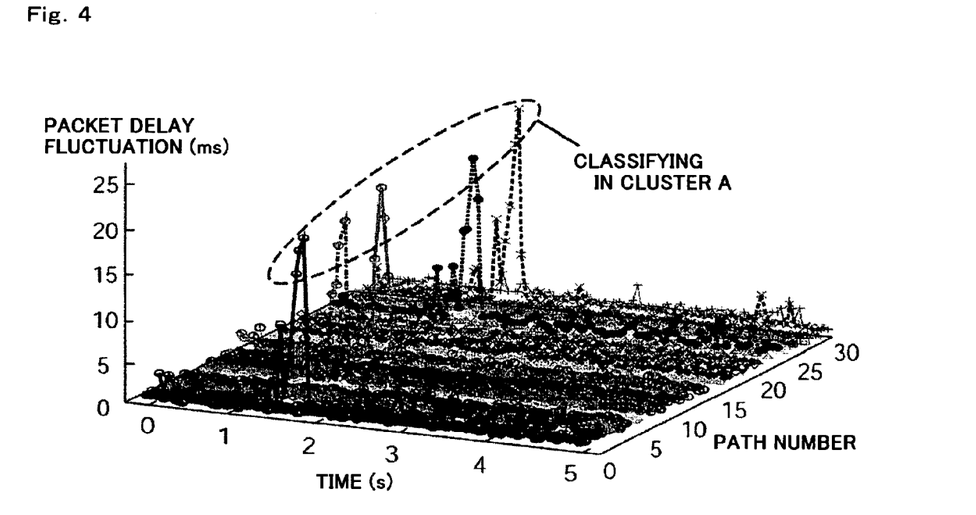
FIG. 4 shows a graph of the packet delay fluctuation of 30 paths in five seconds, in the traffic measurement result in the Internet.

FIG. 4 is a graph showing the packet delay fluctuation of 30 paths in five seconds calculated by a traffic measurement experiment result in the Internet.

The graph of FIG. 4 is calculated in S309. The network based on this graph has three ISP (Internet Service Provider) and an optical fiber access line. By combination of sender ISP and the receiver ISP, an active measurement was performed through 30 paths for 24 hours. To each path, UDP test packets of 64 bytes were sent in interval time in accordance with the uniform distribution of 10-90 ms.

99% value in the packet delay fluctuation of each path was collected for five seconds cycle. In one path, the five seconds which became more than the threshold time 20 ms, is the subject of search. Then the clustering for 30 paths was performed for 704 times. The threshold time must be shorter than the interval time that may be affected by common packet delay fluctuation.

Figure 5:
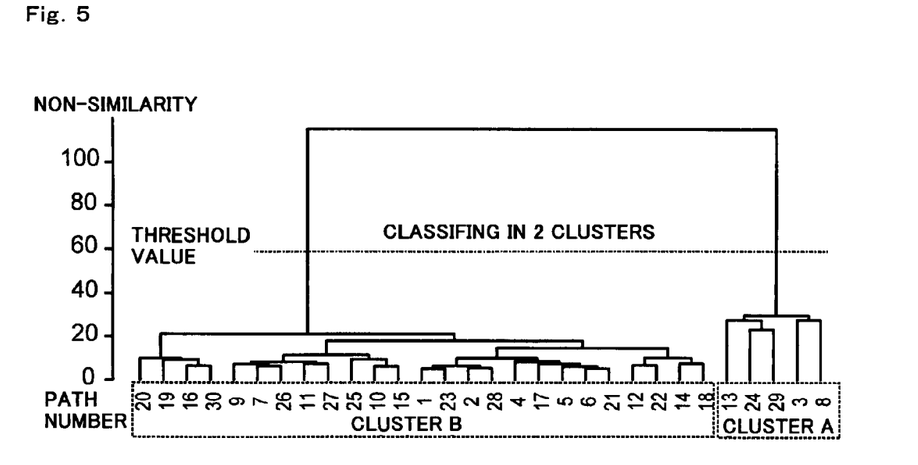
FIG. 5 shows dendrogram of FIG. 4.

FIG. 5 is dendrogram of FIG. 4.

The graph of FIG. 5 is generated by S310. According to the graph of FIG. 5, the axis of ordinates shows non-similarity between the clusters. Also, the graphs classify 30 paths in order of low non-similarity.

Then, the paths are classified by S311. According to the graph of FIG. 5, when the non-similarity was classified by height of ½ of the maximum, the paths are classified into cluster A (paths 13, 24, 29, 3 and 8) and cluster "B" (remaining 25 paths excluding A). Five paths included in cluster "A" correspond to 5 paths of the synchronization increase of the packet delay fluctuation in FIG. 4. On the other hand, in 25 paths included in cluster "B", packet delay fluctuation is not increased. Thus, 5 paths experiencing the same congestion are classified with high precision compared to other 25 paths.

Figure 6:
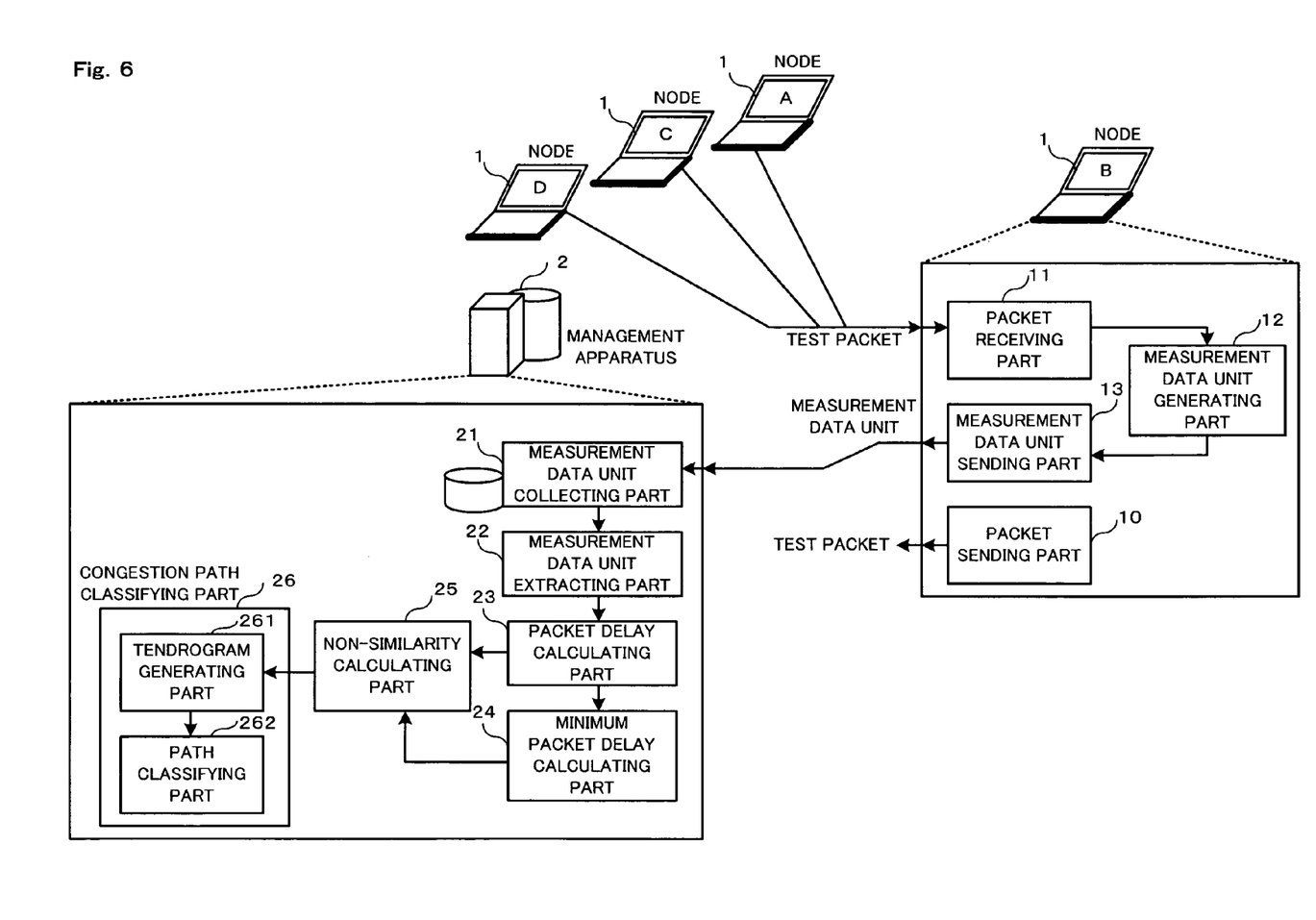
FIG. 6 shows the facility configuration diagram of measurement node and the management apparatus in the present invention.

FIG. 6 shows a functional configuration diagram of the measurement node and the management apparatus of the present invention.

According to FIG. 6, the measurement node 1 has a packet sending part 10, a packet receiving part 11, a measurement data unit generating part 12 and a measurement data sending part 13. These functional parts can be realized by the program to be executed by a computer implemented in the measurement node.

The packet sending part 10 sends a plurality of packets including the sent time to a destination node. The action of previously described S301 is executed.

The packet receiving part 11 receives a plurality of packets including the sent time from a plurality of origin nodes. The action of previously described S302 is executed.

The measurement data unit generating part 12 generates a measurement data unit including an address of the origin node, an address of the destination node, and a sent time and a received time for every received packet. The action of previously described S303 is executed.

The measurement data sending part 13 sends the generated measurement data unit to the management apparatus 2. The action of previously described S304 is executed.

According to FIG. 6, the management apparatus 2 has a measurement data unit collecting part 21, a packet extracting part 22, a packet delay calculating part 23, a minimum packet delay deriving part 24, a non-similarity calculating part 25 and a congestion path classifying part 26. The congestion path classifying part 26 has a dendrogram generating part 261 and a path classifying part 262. These functional parts can realize by the program to be executed by a computer implemented in the management apparatus 2.

The measurement data unit collecting part 21 receives a plurality of measurement data units from a plurality of measurement node 1, and the measurement data units are stored. The action of previously described S306 is executed.

The measurement data unit extracting part 22 extracts a pair of the measurement data units. The measurement data units of the same origin node are arranged in order of sent time. And a pair of measurement data units of which an interval time between the sent times of adjacent measurement data units is less than the threshold time, is extracted. Also, the measurement data units of the same destination node are arranged in order of the received time. And a pair of measurement data units of which an interval time between the received times of adjacent measurement data units is less than the threshold time, is extracted. The action of previously described S307 is executed.

The minimum packet delay deriving part 24 derives the minimum value of the packet delay for every path. The action of previously described S308 is executed.

The non-similarity calculating part 25 calculates square sum of difference between the packet delay and the minimum value for every two pairs of different path. And the mean of those square sums is calculated as non-similarity. The action of previously described S309 is executed.

The dendrogram generating part 261 generates a dendrogram applied by Ward system in order of the low non-similarity, for every pair of paths. The action of previously described S310 is executed.

The path classifying part 262 classifies the paths based on non-similarity of the dendrogram. The action of previously described S311 is executed.

It is difficult to measure the packet pair gap of the segment on the way of the path. Therefore when the origin node is same, a difference between the sent times of the packets is the packet pair gap. Also, when the destination node is the same, a difference between the received times of the packets is the packet pair gap. Otherwise, there are many cases that do not share segment. In that case, for convenience, it is calculated by a difference between the received times of the packets.

According to the congestion path classification method of the present invention, for IP network, path experiencing the common congestion can be classified based on packet delay in order to detect congestion occurring for a short time caused by packet delay. Thus, paths can be classified for the deterioration in the layer 2 node that cannot be detected in "traceroute". The present invention compares the packet delay fluctuation by packet unit, and the quality of each path can be classified based on the similarity of the fluctuation.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method in a management apparatus for classifying congestion paths among a plurality of paths between measurement nodes, the method comprising:

receiving measurement data units each indicating an origin node, a destination node, and a sent time and a received time in received packets from the measurement nodes, arranging the measurement data units of the same origin node in order of sent time, extracting at least one pair of measurement data units which are temporally adjacent and which have an interval time between the sent times of the adjacent measurement data units, the interval time being shorter than a threshold time, arranging the measurement data units of the same destination node in order of the received time, extracting at least one pair of measurement data units which are temporally adjacent and which have an interval time between the received times of the adjacent measurement data units, the interval time being shorter than the threshold time, calculating a plurality of packet delay values based on differences between the sent times and the received times for the extracted measurement data units, and classifying the congestion paths based on the packet delay values.

2. The method according to claim 1, wherein the classifying comprises:

calculating a minimum value of the packet delay values for each path, calculating a square sum of differences between the packet delay values and the minimum value for each of a plurality of path pairs, each path pair being made of two different paths selected from this plurality of paths, calculating a mean of square sum as non-similarity for each path pair, and selecting at least one path pair of low non-similarity, from the plurality of path pairs.

3. The method according to claim 2, wherein the classifying further comprises:

generating a dendrogram by application of a Ward system to the plurality of path pairs in ascending order of the non-similarity, and classifying the congestion paths depending on the non-similarity of the dendrogram.

4. A management apparatus for classifying congestion paths among a plurality of paths between measurement nodes, the management apparatus comprising:

means for receiving measurement data units each indicating an origin node, a destination node, and a sent time and a received time in received packets from the measurement nodes, means for arranging the measurement data units of the same origin node in order of sent time, extracting at least one pair of measurement data units which are temporally adjacent and which have an interval time between the sent times of the adjacent measurement data units, the interval time being shorter than a threshold time, arranging the measurement data units of the same destination node in order of the received time, and extracting at least one pair of measurement data units which are temporally adjacent and which have an interval time between the received times of the adjacent measurement data units, the interval time being shorter than the threshold time, means for calculating packet delay values based on differences between the sent times and the received times for the extracted measurement data units, and means for classifying the congestion paths based on the packet delay values.

5. The apparatus according to claim 4, wherein the classifying means comprises:

means for calculating a minimum value of the packet delay for values for each path, means for calculating a square sum of differences between the packet delay values and the minimum value for each of a plurality of path pairs, each path pair being made of two different paths selected from the plurality of paths, calculating a mean of the square sum as non-similarity for each path pair, and selecting at least one path pair of low non-similarity, from the plurality of path pairs.

6. The apparatus according to claim 5, wherein the classifying means further comprises:

means for generating a dendrogram by application of a Ward system to the plurality of path pairs, in ascending order of the non-similarity, and means for classifying the congestion paths depending on the non-similarity of the dendrogram.

7. A method for causing a computer to function as a management apparatus for classifying congestion paths based on packet delay in a plurality of paths between measurement nodes, the method in said management apparatus comprising:

receiving measurement data units each indicating an origin node, a destination node, and a sent time and a received time in received packets from the measurement nodes, arranging the measurement data units of the same origin node in order of sent time, extracting at least one pair of measurement data units which are temporally adjacent and which have an interval time between the sent times of the adjacent measurement data units, the interval time being shorter than a threshold time, arranging the measurement data units of the same destination node in order of the received time, extracting at least one pair of measurement data units which are temporally adjacent and which have an interval time between the received times of the adjacent measurement data units, the interval time being shorter than the threshold time, calculating a plurality of packet delay values based on differences between the sent times and the received times for the extracted measurement data units, and classifying the congestion paths based on the packet delay values.

8. The method according to claim 7, wherein the classifying comprises:

calculating a minimum value of the packet delay values for each path, calculating a square sum of differences between the packet delay values and the minimum value for each of a plurality of path pairs, each path pair being made of two different paths selected from the plurality of paths, calculating a mean of the square sum as non-similarity for each path pair, and selecting at least one path pair of low non-similarity, from the plurality of path pairs.

9. The method according to claim 8, wherein the classifying further comprises:

generating a dendrogram by application of a Ward system to the plurality of path pairs in ascending order of the non-similarity, and classifying the congestion paths depending on the non-similarity of the dendrogram.

10. A method in a management apparatus for classifying congested paths among a plurality of paths between a plurality of nodes, the method comprising:

receiving from the nodes a plurality of packets each of which indicates an origin node, a destination node, and a transmit time and a receive time of each packet;

extracting from the received packets at least one first packet pair each of which is made of two packets, wherein the two packets share a same origin node, the two packets are temporally adjacent to each other, the two packets have an interval time between the transmit times of the adjacent packets, the interval time being shorter than a threshold time, and the two packets are related to two different paths;

extracting from the received packets at least one second packet pair each of which is made of two packets, wherein the two packets share a same destination node, the two packets are temporally adjacent to each other, the two packets have an interval time between the receive times of the adjacent packets, the interval time being shorter than the threshold time, and the two packets are related to two different paths; and classifying the congested paths into a plurality of clusters, by performing cluster analysis for a plurality of path pairs using the extracted packet pairs, each path pair being made of two different paths selected from the plurality of paths.

11. The method according to claim 10, further comprising calculating a plurality of packet delay values for a plurality of packets which belong to the extracted packet pairs, wherein the classifying comprises performing the cluster analysis for the path pairs, based on the calculated packet delay values.

12. The method according to claim 11, wherein the classifying comprises:

per each path pair, calculating a degree of non-similarity between two paths which belong to each path pair, based on differences in packet delay between two packets that belong to one of the extracted packet pairs which corresponds to each path pair; and performing the cluster analysis for the path pairs, based on a plurality of degrees of non-similarity calculated for the respective path pairs.

* * * * *